United States Patent
Kuth et al.

(10) Patent No.: US 6,650,924 B2
(45) Date of Patent: Nov. 18, 2003

(54) METHOD AND APPARATUS FOR THE AUTOMATIC RECOGNITION OF PNEUMOTHORAX

(75) Inventors: Rainer Kuth, Herzogenaurach (DE); Thomas Rupprecht, Uttenreuth (DE); Maren Wagner, Erlangen (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 10/037,087

(22) Filed: Nov. 9, 2001

(65) Prior Publication Data

US 2002/0128549 A1 Sep. 12, 2002

(30) Foreign Application Priority Data

Nov. 9, 2000 (DE) .......................................... 100 55 564

(51) Int. Cl.[7] .............................................. A61B 5/055
(52) U.S. Cl. ...................... 600/410; 600/425; 382/173
(58) Field of Search ............................... 600/410, 425, 600/407; 382/173

(56) References Cited

U.S. PATENT DOCUMENTS

| | | | | |
|---|---|---|---|---|
| 5,361,763 A | * | 11/1994 | Kao et al. ................. | 600/410 |
| 5,600,574 A | * | 2/1997 | Reitan ....................... | 702/185 |
| 5,668,888 A | * | 9/1997 | Doi et al. .................. | 382/132 |
| 5,825,909 A | * | 10/1998 | Jang .......................... | 382/132 |
| 6,058,322 A | * | 5/2000 | Nishikawa et al. ........ | 600/408 |
| 6,246,897 B1 | * | 6/2001 | Foo et al. .................. | 600/413 |
| 6,366,797 B1 | * | 4/2002 | Fisher et al. .............. | 600/410 |
| 6,366,800 B1 | * | 4/2002 | Vining et al. .............. | 600/425 |
| 6,370,415 B1 | * | 4/2002 | Weiler et al. .............. | 600/410 |
| 6,438,403 B1 | * | 8/2002 | Cline et al. ................ | 600/410 |

OTHER PUBLICATIONS

"Anatomical Model Matching With Fuzzy Implicit Surfaces for Segmentation of Thoracic Volume Scans," Lelieveldt et al, IEEE Trans. on Medical Imaging, vol. 18, No. 3, Mar. 1999, pp. 218–230.

* cited by examiner

Primary Examiner—George Manuel
Assistant Examiner—Devaang Shah
(74) Attorney, Agent, or Firm—Schiff Hardin & Waite

(57) ABSTRACT

In an apparatus for the recognition of pneumothorax using thorax MR exposures, an evaluation device segments the image of the rib cage, including its surroundings, and characterizes a zone detected between rib cage and lung, preferably in the exhaled condition, that has an MR signal elevated by a prescribed safety margin compared to the noise signal in air.

7 Claims, 1 Drawing Sheet

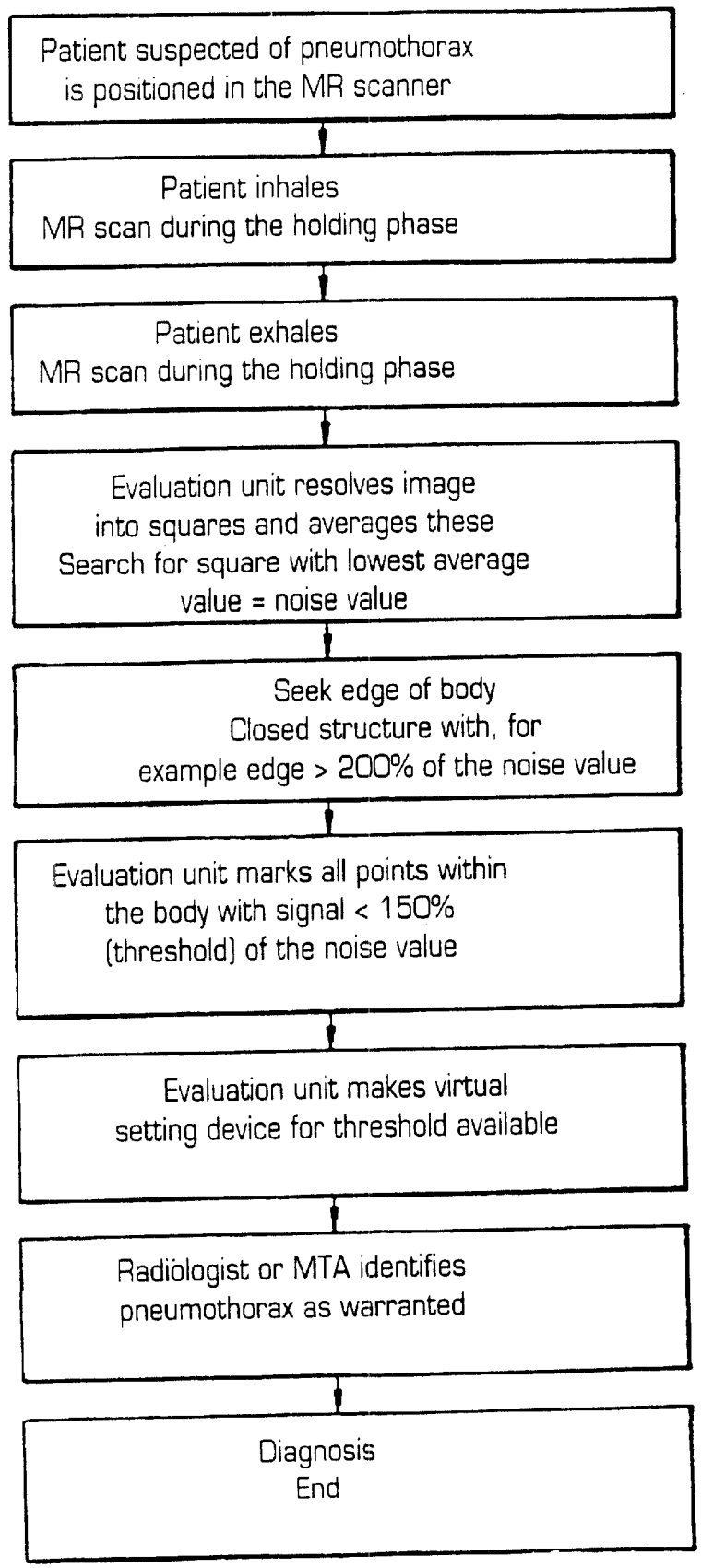

METHOD AND APPARATUS FOR THE AUTOMATIC RECOGNITION OF PNEUMOTHORAX

BACKGROUND OF THE INVENTION

1. Field of the Invention

The present invention is directed to a method and apparatus for the recognition of pneumothorax with the assistance of thorax MR exposures.

2. Description of the Prior Art

Pneumothorax is an illness wherein the outer membrane (visceral pleura) of the lung exhibits leakage. As a result, a dead volume arises in the pleura; space or cavity between the outer lung membrane and the rib cage.

This condition can usually be identified with a thorax X-ray exposure. For this purpose, the patient must exhale to the greatest possible extent, and the radiologist can the recognize the outer lung membrane in shadowy fashion in the image, as well as the blood vessels that proceed from the middle of the lung toward the edge and end at the lung membrane. Such X-ray examinations, however, represent a general radiation stress and should currently be avoided, if possible, or greatly limited.

Due to this radiation stress, an automated method for recognizing pneumothorax that is disclosed in U.S. Pat. No. 5,668,888, and wherein X-ray exposures are likewise utilized, is only conditionally suited for practice. Moreover, this method requires extensive filter stages for blanking out the bone structures. This blanking, of course, never can ensue free of disturbance, and even the minutest disturbances in the region of the pneumothorax—which already exhibits only slight attenuation differences —can lead to a falsification or non-recognition of a pneumothorax. Moreover, a pneumothorax lying behind a bone structure could not be recognized even after the bone structure is filtered out since, of course, it was not presented in the exposure at all.

The employment of magnetic resonance exposures for thorax examination is known from various publications, such MR exposures supplying excellent images of the lung without radiation stress. Standard MR exposures of the lung have usually been produced with the lung inflated. It has also been proposed in the case of such magnetic resonance exposures—see Lelieveldt, B. P. F. et al., "Anatomical Model Matching with Fuzzy Implicit Surfaces for Segmentation of Thoracic Volume Scans" in IEEE Transactions on Medical Imaging, vol. 18, no. 3, March 1999, pages 218–230—to utilize a system wherein the boundaries between the organs and the air surrounding them can be recognized and displayed in automated fashion by means of a clear segmentation. Of principal concern, obviously, is the exact demarcation of the individual tissue structures rather than a recognition of a pneumothorax, since the tissue structures never or hardly ever yield the exact noise signal of air.

SUMMARY OF THE INVENTION

An object of the present invention is to provide an apparatus for the automatic recognition of pneumothorax using thorax MR exposures that allows a standardized, automatic recognition of pneumothorax without a complicated interpretation on the part of the radiologist.

This object is inventively achieved in a method and an evaluation device for the thorax MR exposures for segmentation of the image of the rib cage, including its surroundings, and for characterization of a zone detected between the rib cage and the lung, preferably in the exhaled condition, that has an MR signal elevated by a prescribed safety margin compared to the noise signal in air.

It is of considerable significance for the inventive method and apparatus that X-ray exposures conventionally employed for the recognition of pneumothorax are replaced by MR exposures, which represent less of a stress on the body of the patient from the very outset. The important factor, however, is that these MR exposures inherently can be obtained relative to the slice to be examined so that the (usually rather thick) slice under observation in fact covers the lung tissue but not the ribs and other bone structures that lie in front of it or behind it. As a result, superimpositions that render a pneumothorax invisible and disturbances when filtering out the bone structures that lead to the same negative result can be avoided.

The rib cage and the lung tissue, particularly the outer lung membrane as well, can be very clearly distinguished from their surroundings due to their high water and fat content, since strong MR signals occur at these locations. When a zone having a signal level comparable to the noise level prevailing outside the body occurs between the rib cage and the lung tissue, then this is a good indication of a pneumothorax.

The inventive evaluation and detection device can have a window discriminator that examines the signals of juxtaposed points in quadratic segments, averages the signals and then utilizes the zone with the lowest average value as the basis for the noise level, and which utilizes zones with significantly higher values, i.e. at least twice the noise, for recognizing the physical structure of the edge of the lung, and which chromatically marks zones with an average signal value $\leq$approximately 150% of the noise level. When interconnected regions of such chromatically marked points lie in the inside of the body, i.e. specifically between the rib cage and the lung tissue, then this represents a pneumothorax. This also constitutes a critical difference over the initially described method and system of Lelieveldt wherein the segmentation ensues exactly on the signal noise of air for the purpose of delimiting the organs from the surrounding air space.

DESCRIPTION OF THE DRAWING

The single FIGURE is a flowchart describing the inventive method, and describing the operation of an inventive apparatus.

DESCRIPTION OF THE PREFERRED EMBODIMENTS

A patient admitted with a suspected pneumothorax is positioned in an MR scanner, and magnetic resonance exposures are then produced both in the inhaled condition as well as subsequently in the exhaled condition—this latter phase is actually more important for the recognition of a pneumothorax. Using the inventive apparatus, the image is resolved (segmented) into squares via an evaluation unit, and the signal points within the squares are averaged. The squares with the lowest average value correspond to the noise value, i.e. to the value of air outside the body, whereas the edge of the body or other closed structures with an edge, such as the lung edge, can be acquired by prescribing signal values for the averages that are greater than 200% of the noise value.

With the assistance of a window discriminator, finally, all points within the body having signal values <150% of the noise value—the threshold could, for example, also amount to only 110% of the noise value—are chromatically marked in the displayed image, so that, given the presence of a pneumothorax, the chromatic structure at the edge of the lung automatically indicates the pneumothorax as such and indicates its exact positioning. As warranted, the evaluation unit also can make a virtual setting device available for the thresholds that are employed.

Finally, the radiologist or the MTA identifies the inventively automatically detected, measured and demarcated pneumothorax in the displayed image, whereupon the examination is terminated.

Although modifications and changes may be suggested by those skilled in the art, it is the intention of the inventors to embody within the patent warranted hereon all changes and modifications as reasonably and properly come within the scope of their contribution to the art.

We claim as our invention:

1. An apparatus for automatic recognition of pneumothorax comprising:
    an evaluation unit supplied with data representing a thorax MR exposure containing a thorax region between the rib cage and a lung including a portion of the pleural cavity and also containing an exposure region of air outside of the thorax, said evaluation unit identifying a noise signal of air in said exposure region and dividing only said thorax region between the rub cage and a lung on said image into a plurality of segments and identifying any of said segments having an MR signal therein which is elevated by a predetermined margin compared to the noise signal in air; and
    a display unit connected to said evaluation unit wherein said identified segments are displayed with a visually perceptible indication.

2. An apparatus as claimed in claim 1 wherein said evaluation unit causes said identified segments to be displayed at said display with a chromatic marking.

3. An apparatus as claimed in claim 1 wherein said evaluation unit comprises a window discriminator which analyzes signals of juxtaposed points in quadratic segments, averages said signals, and uses a segment having a lowest average as a basis for said noise signal in air, uses segments with an average which is at least twice said lowest average as indicating a physical structure of an edge of the lung, and chromatically marks segments having an average signal value greater than or equal to approximately 150% of said noise signal in air.

4. A method for automatic recognition of pneumothorax comprising the steps of:
    obtaining a thorax MR exposure of a subject, said thorax MR exposure containing a thorax region between the rib cage and a lung including a portion of the pleural cavity and also containing an exposure region of air outside of the thorax;
    in a computational unit automatically dividing only said thorax region between the rib cage and a lung in said image into a plurality of segments;
    in a computational unit automatically evaluating the respective MR signals in said segments in said computational unit;
    in said computational unit, automatically identifying a noise signal of air in said exposure region identifying any of said segments having an MR signal which is elevated above a predetermined margin compared to the noise signal in air; and
    displaying said thorax MR exposure with said identified segments having a visually perceptible indication.

5. A method as claimed in claim 4 comprising displaying said identified segments with a chromatic marking.

6. A method as claimed in claim 4 wherein the step of identifying said segments having an MR signal elevated by a predetermined margin compared to the noise signal in air comprises examining signals of juxtaposed points in quadratic segments, averaging said signals, using a segment having a lowest average as a basis for said noise signal in air, utilizing segments with respective average values which are at least twice said noise signal as representing a physical structure of an edge of the long, and chromatically marking segments in said display having an average which is greater than or equal to approximately 150% of said noise signal in air.

7. A method as claimed in claim 4 comprising the additional step of causing said subject to exhale while said thorax MR exposure is produced.

* * * * *